Figure 7:
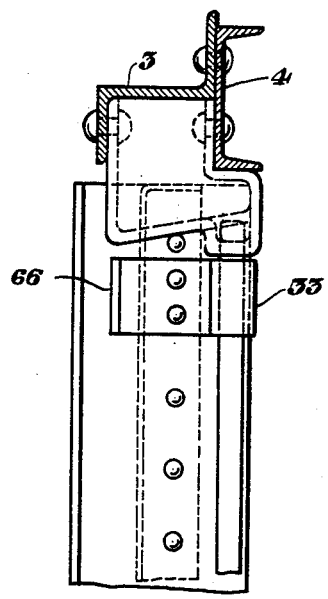

Aug. 22, 1933.    W. P. MURPHY    1,923,791
FREIGHT CAR DOOR
Filed Sept. 8, 1928    3 Sheets-Sheet 1
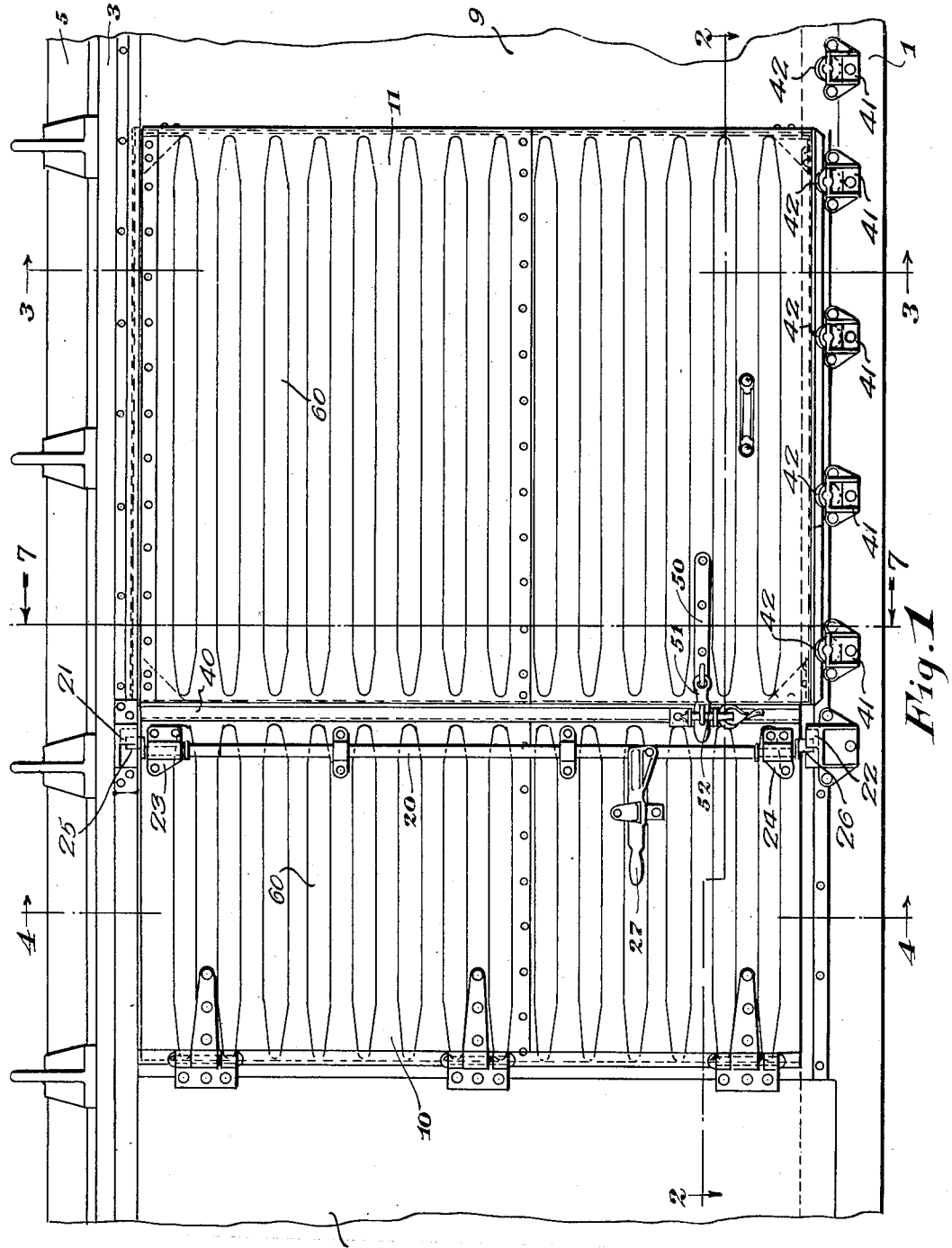
Inventor
Walter P. Murphy
Barnett & Truman
Attorney

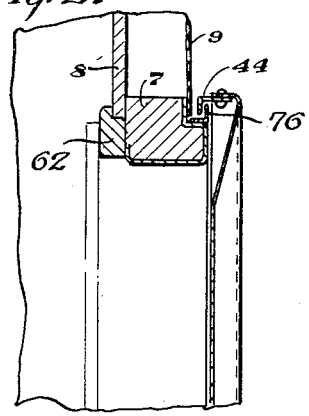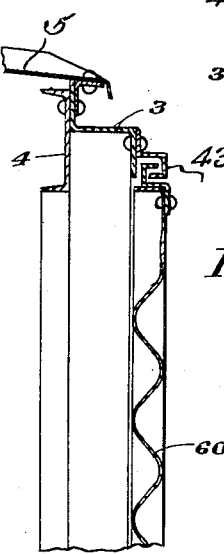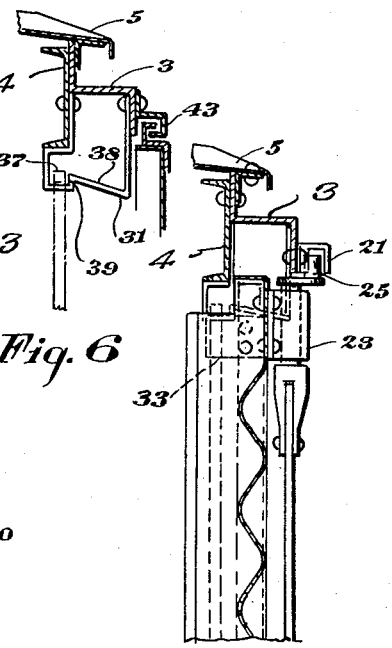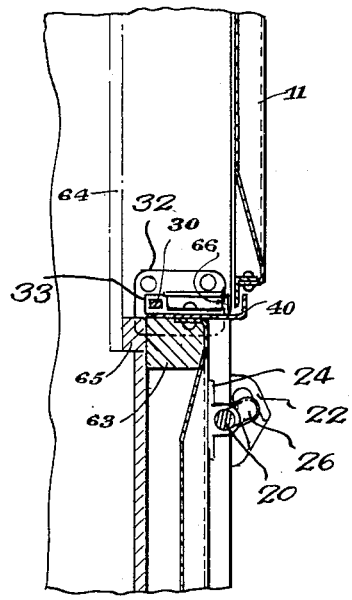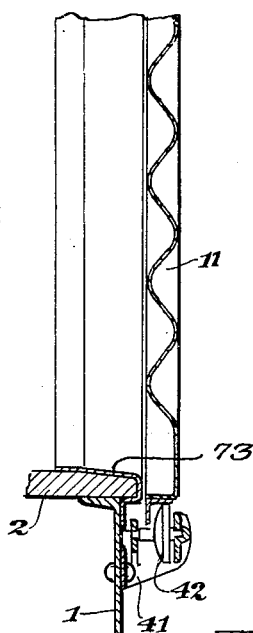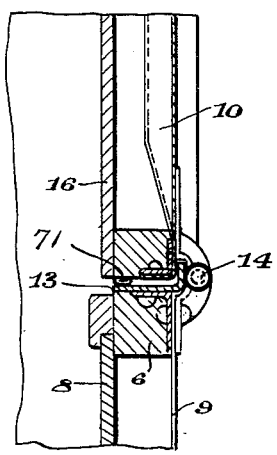

Aug. 22, 1933.    W. P. MURPHY    1,923,791
FREIGHT CAR DOOR
Filed Sept. 8, 1928    3 Sheets-Sheet 3

Inventor:
Walter P. Murphy
by
Barrett & Numan
Attorneys.

Patented Aug. 22, 1933

1,923,791

UNITED STATES PATENT OFFICE 1,923,791

FREIGHT CAR DOOR

Walter P. Murphy, New York, N. Y., assignor to Railway Metal Products Company, Chicago, Ill., a Corporation of Delaware Application September 8, 1928
Serial No. 304,753

10 Claims. (Cl. 189—46)

The invention relates to a double door construction for railway box or house cars, particularly cars for carrying automobiles and similar freight.

The American Railway Association standard box car has a side door opening six feet in width but as it is impossible to load certain classes of lading, such as automobiles, automotive trucks and the like through such a space, larger openings (usually about ten feet in width) are provided in some cars, which are called automobile cars, although they may be used on some occasions for other kinds of lading. A single door large enough to cover such an opening would be too large and heavy to move easily or to sustain and retain on the car, and therefore supplemental doors slidably mounted like the main doors have been provided to cooperate with the main door in closing the enlarged opening.

The primary object of this invention is to provide an arrangement of main and supplemental doors for a railway car having a door opening, thus enlarged for the loading of automobiles, for example, in which the main door is a sliding door, as has been customary, but in which the supplemental door is hinged and so related to the wall structure of the car that when it is closed it forms structurally and functionally a part of the car wall in a manner and to an extent quite impossible in the case of a sliding door.

Another object is to provide a double door structure of the kind indicated in which the swinging or hinged door is so constructed and arranged that it is possible to use as the main door a six foot sliding door of the types now in common use on railway box cars.

Another object is to provide means whereby the swinging door cannot be moved from its position as an integrated part of the wall structure until the main door has been opened. That is, a swinging door cannot be used as a door independently of the main door.

Another object is to provide novel and improved means for locking the two doors together to the wall structure of the car and novel and improved means for making the door structure weatherproof and proof against leakage of bulk cargoes such as grain.

Another object is to construct and arrange the swinging door so that its outer and inner surfaces, more especially its inner surface, are flush or in the same planes with the inner and outer sheathings of the car wall; the door being preferably provided with an inner sheathing of the fixed portion of the adjacent car wall whereby no cooperage is required for the swinging door for grain loads.

Another object is to provide means on a swingable door to forcibly close it or, to forcibly give it its initial opening movement, in combination with a separate means to automatically lock the top and bottom of the door.

Figure 8:
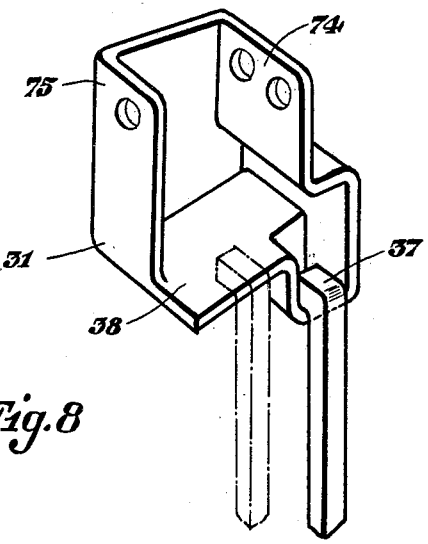
Figure 9:
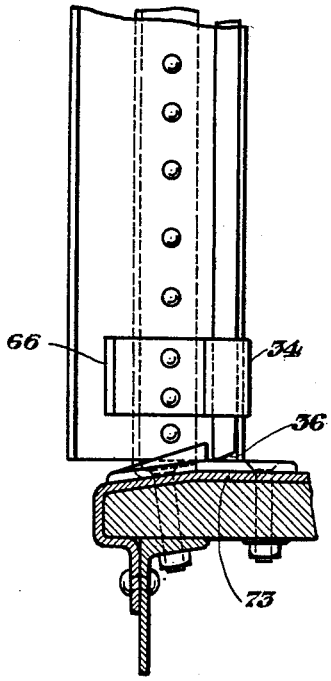
Figure 10:
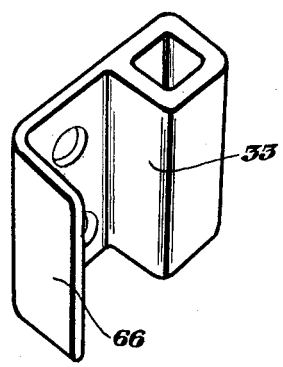

In the drawings:

Fig. 1 shows a side elevation of a part of the car with my invention applied thereon.
Fig. 2 is a section on line 2—2 of Fig. 1.
Fig. 3 is a section on line 3—3 of Fig. 1.
Fig. 4 is a section on line 4—4 of Fig. 1.
Fig. 5 is a section through the threshold.
Fig. 6 is a section through the lintel.
Fig. 7 is a vertical sectional elevation on line 7—7 of Fig. 1.
Fig. 8 is a fragmentary view in perspective of the locking devices for engaging the upper edge of said door with the frame structure of the car.
Fig. 9 is a view in perspective of a cam and locking plate on the door sill adjacent the free edge of the supplemental door when closed.
Fig. 10 is a similar view of one of the keeper plates on the supplemental door for the locking bar.

The usual parts of the car are shown, such as the side sill 1, flooring 2, side plate 3, side plate reinforcement 4 over the doorway, roof 5, front door post 6, rear door post 7, lining 8 and sheathing 9. As stated before, an automobile car is provided with a larger door opening than is usual in railway box cars.

The large door opening is partially closed by a supplemental swingable door 10 hinged at one side thereof and partially by a main slidable door 11 supported upon the car body in any convenient manner.

The front door post 6 is reinforced by a frame member 13 having a flange projecting toward the door opening and the hinge line 14 of the supplemental door is so located that the door will swing behind the inner part of this flange. Loose hinges are used so that when outward pressures are exerted against the inside of the door it bears against this flange, thus relieving the hinges. Furthermore, this arrangement provides a lading-proof construction from within and a weatherproof construction from without. A cushion 71 may be applied between the door and the post if desired.

The supplemental door 10 preferably composed in part of metal is provided with a wooden lining 16 and is of substantially the same thickness as the side wall of the car. It is positioned when closed with its inner surface flush with the inside surface of the inner lining 8 of the car wall and with its outside surface, preferably, flush with the outside surface of the car wall. When the supplemental door is closed and locked it forms structurally a part of the side wall of the car, giving a smooth interior surface and providing a smooth exterior finish and appearance. It is not more subject to side swiping, for example, than the rest of the side wall of the car. The lining 16 provides means for blocking the lading and if a metallic door is used (such as illustrated) it prevents sweating by keeping the lading out of contact with the metal.

The supplemental door swings to one side of a projection 70 on the cam and locking plate 32 secured to the sill plate 73 on the floor so that the inertia of the door when closed is resisted by this projection and not by the hinges. The inertia of the door in the opposite direction is resisted by the front door post. The looseness in the hinges, referred to before, provides clearances and allows for variations in the associated parts.

An eccentric rod 20 is mounted upon the supplemental door 10 operably engageable with devices 21 and 22 upon the car body to swing the top and bottom of the car door simultaneously toward or away from the car body. The eccentric mechanism comprises the rod 20 which is rotatably mounted upon the door by brackets 23 and 24. This rod has eccentric portions 25, 26 which when the door is almost closed engage the inclined surface of the members 21 and 22 so that by rotation of the rod the door may be positively forced outwardly or inwardly, as desired. The operating handle 27 is provided with means to lock it and the door in closed position. This not only prevents pilfering but also prevents the eccentric rod from revolving in case a shifting movement of the cargo should impose a force upon the inside of the door.

A locking bar 30 is carried by the supplemental door 10 which automatically engages a locking member 31 (Fig. 8) and the locking plate 32, referred to above (Fig. 9) positioned adjacent the top and bottom of the door opening, respectively, to anchor the door in its closed position to the car wall structure. The locking bar 30 is longitudinally movable in keepers 33—34 (Fig. 10) so that when the door is swung, in a closing movement, toward the car the lower bevelled end 36 of the rod rides upon the inclined cam surface 35 of the projection 70 until it falls by gravity behind the vertical shoulder of projection 70. The upper end of this bar 30 has a lateral projection 37 which at the same time rides upon or above the inclined surface 38 of the upper locking member 31 until it falls into the pocket 39 with which member 31 is formed. The means for locking the upper and lower parts of the door may consist of separate mechanisms, but it is preferable to have one unitary locking bar, the opposite ends of which simultaneously ride upon one or other of the inclined surfaces 35 and 38 and simultaneously fall behind the projection 70 and into pocket 39 so that it is impossible for either the upper part or the lower part of the door to be locked without the other part also being locked. The locking device 31 is formed with flanges 74, 75 for attachment to the side plate 3 and reinforcing plate 4. The remaining and main portion of the door opening is closed by the main door 11 which may be supported upon the car body adjacent its top or bottom in any convenient and usual manner and arranged to slide horizontally along the outside of the car wall. The outer edge of the supplemental door 10 is provided with a flanged bar 40 behind which the main door moves into closed position, thus forming a weatherproof and burglar-proof construction. The keepers 33 are formed with lugs 66 which extend back of the rear edge of the main door when the latter is in closed position, so that the supplemental door cannot be swung out until the main door is moved in the opening direction. The main door 11, as illustrated, is supported by brackets 41 having anti-friction rollers 42 mounted therein upon which the door rolls and has a weatherproof and burglarproof arrangement 43 at the top, which construction also supports the door in case the brackets 41 are torn from the car. The rear edge of the sliding door is provided with an inwardly projecting lip 44 which moves behind an outwardly projecting lip 76 on the car body. These are familiar arrangements, one of the advantages of the invention being that so far as the main door is concerned the door and its associated parts may be of common construction.

One of the doors has a hasp arrangement 50 secured to it which engages a staple and lock arrangement 52 on the other door so that the two doors may be locked together, thus one lock (and seal) fastens both doors in closed positions. With the portion of the sliding door projecting between the flange 40 and the lugs 66 on the supplemental door, it is impossible to slide the main door 11 or to swing the supplemental door 10 without removing the hasp from the staple.

Either the main door or the supplemental door (or both if desired) may be made of a metallic plate reinforced and stiffened by integral corrugations 60, which plate is provided with integral flanges at some or all of its edges to which stiffening means are secured. These corrugations act as beams to transmit loads imposed upon them to their terminations and thence to the stiffened edges of the door. When a metallic supplemental door is used it is advisable to provide it with a wood lining 16 for reasons heretofore mentioned. Preferably the front edge of the supplemental door is provided with a wooden nailing strip 65 to which and to a corresponding strip 62 at the forward edge of the door opening temporary cooperage boards 64 may be nailed or otherwise secured. The supplemental door being lined with a wood lining flush with the wood lining of the permanent part of the car wall requires no coopering.

The American Railway Association standard box car is provided with a side door opening six feet wide, but, as stated, for automobile cars this horizontal distance may be increased to ten feet. Therefore, in actual practice my supplemental door will close about four feet of the large door opening so that the remainder of the door opening is of the standard six foot dimension. With this arrangement any of the doors which are now standard on any of the various railroads could be used with my construction. In describing the hinged door as "flush" with the car wall structure, an arrangement is intended in which the outer face of the door will be in the same plane, or substantially so with the outer surface of the adjacent part of the fixed car wall structure.

I claim:

1. In combination with the wall structure of a railway box car having a door opening; means for closing said opening comprising a door hinged to the wall structure at one vertical edge of the door opening, and a sliding door consisting of a rigid door panel mounted on the wall structure at one horizontal edge of the door opening and slidable across the door opening into engagement with the hinged door when the latter is closed, said doors having intersecting vertical meeting edges engaged so that when the sliding door is closed the hinged door cannot be opened.

2. In combination with the wall structure of a railway box car having a door opening; means for closing said opening comprising a door hinged to the wall structure at one vertical edge of the door opening and adapted to close a portion of said opening, and a sliding door consisting of a single rigid structure mounted on the wall structure at one horizontal edge of the door opening and slidable across the door opening to close the remaining portion of the same, said hinged door being flush when closed with the adjacent part of said wall structure, and said doors having interfitting vertical meeting edges engaged so that when the sliding door is closed the hinged door cannot be opened.

3. In combination with the wall structure of a railway box car comprising outside sheathing and inner lining and formed with a door opening; means for closing said opening comprising a door hinged to the wall structure at one vertical edge of the door opening for closing a portion of said opening, and a sliding door consisting of a single rigid structure mounted on the wall structure at one horizontal edge of the door opening and slidable across the door opening to close the remaining portion of the same, said hinged door being flush when closed with the adjacent part of said wall structure and provided with a lining in substantial alignment with the lining of said wall structure, said doors having interfitting vertical meeting edges engaged so that when the sliding door is closed the hinged door cannot be opened.

4. In combination with the wall structure of a railway box car comprising outside sheathing and inner lining and formed with a door opening; means for closing said opening comprising a door hinged to the wall structure at one vertical edge of the door opening for closing a portion thereof, and a sliding door consisting of a single rigid structure mounted on the wall structure at one horizontal edge of the door opening and slidable across the door opening to close the remaining portion of the same, said hinged door being flush when closed with the adjacent part of said wall structure and provided with a sheet metal outside sheathing and a wooden lining, which latter is in substantial alignment with the lining of said wall structure, said doors having interfitting vertical meeting edges engaged so that when the sliding door is closed the hinged door cannot be opened.

5. In combination with the wall structure of a railway box car having a door opening; means for closing said opening comprising a door hinged to the wall structure at one vertical edge of the door opening to close a portion of said door opening, and a sliding door consisting of a single rigid structure slidable across the door opening to close the remaining portion of the same, said doors having interfitting vertical meeting edges engaged so that when the sliding door is closed the hinged door cannot be opened; and interlocking devices on the upper and lower outer corners of the hinged door and on the car structure, which are automatically brought into engagement when the hinged door is closed to anchor said door to the car structure.

6. In combination with the wall structure of a railway box car having a door opening; means for closing said opening comprising a door hinged to the wall structure at one vertical edge of the door opening for closing a portion of said opening, and a sliding door consisting of a single rigid structure mounted on the wall structure at one horizontal end of the door opening and slidable across the door opening to close the other portion of the same, said doors having interfitting vertical meeting edges engaged so that when the sliding door is closed the hinged door cannot be opened.

7. In combination with the wall structure of a railway box car having a door opening; means for closing said opening comprising a sliding door consisting of a single rigid structure mounted on the wall structure at one horizontal edge of the door opening and slidable across the door opening to close a portion of said door opening and which sliding door, when in closed position, is offset outwardly in respect to said wall structure, and a door hinged to the car wall structure at one vertical edge of the door opening to close the remaining portion of said door opening, which hinged door, when in closed position, is flush with said wall structure, said doors having interfitting vertical meeting edges engaged so that when the sliding door is closed the hinged door cannot be opened.

8. In combination with the side wall structure of a railway box car formed with a door opening; a sliding door consisting of a single rigid structure for closing said door opening at one side, provided with a lip on its forward vertical edge; a door hinged to the wall structure at the opposite side of the door opening provided with spaced projecting elements on its free edge between which extends the lip on the sliding door when the doors are in closed position; and means for anchoring the upper and lower corners of the hinged door, at its free edge, to the car structure.

9. In combination with the side wall structure of a railway box car formed with a door opening; a sliding door consisting of a single rigid structure for closing said door opening at one side, provided with a lip on its forward vertical edge; a door hinged to the wall structure at the opposite edge of the door opening provided with spaced projecting elements on its free edge between which extends the lip on the sliding door when the doors are in closed position; and means for anchoring the upper and lower corners of the hinged door, at its free edge, to the car structure; said hinged door being flush with the wall structure of the car, when closed, and the sliding door, when in closed position, being offset outwardly from said wall structure.

10. In a railway car wall having a door opening therein, the combination of a door swingably mounted upon said wall adjacent one vertical edge of the opening to partially close said opening when in closed position, and another door slidably mounted upon said wall to close the remainder of said opening when in closed position, said slidable door arranged to partially overlap the swingable door when both are in closed positions to retain the swingable door in closed position until the slidable door is moved.

WALTER P. MURPHY.